W. R. PIERCE.
DASH VISION TANK GAGE.
APPLICATION FILED OCT. 30, 1916.

1,236,347.

Patented Aug. 7, 1917.
3 SHEETS—SHEET 1.

Witnesses
L. J. Woodhull
A. M. Dorr.

Inventor
William R. Pierce,
By
Attorneys

W. R. PIERCE.
DASH VISION TANK GAGE.
APPLICATION FILED OCT. 30, 1916.
1,236,347.
Patented Aug. 7, 1917.
3 SHEETS—SHEET 2.
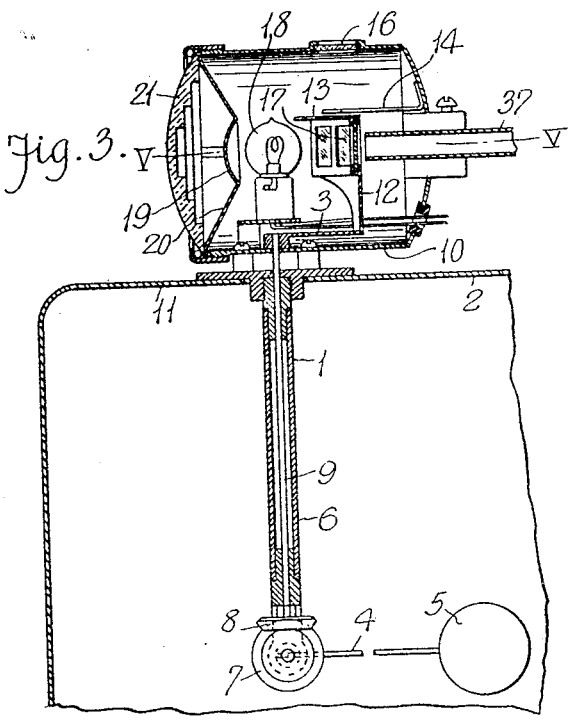
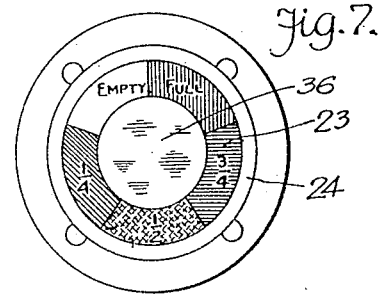
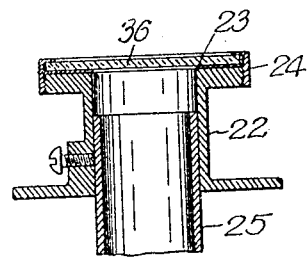
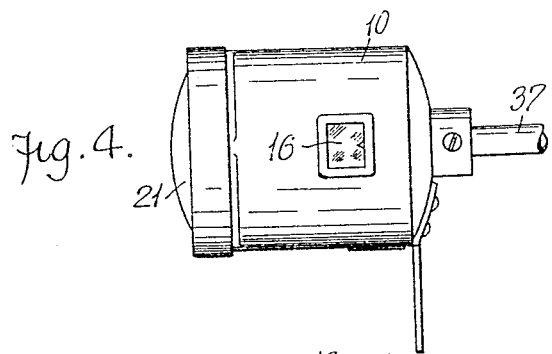
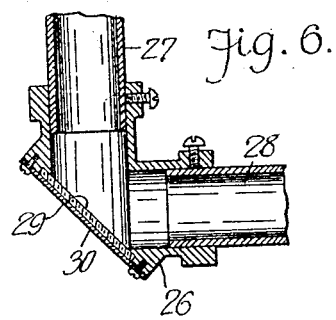
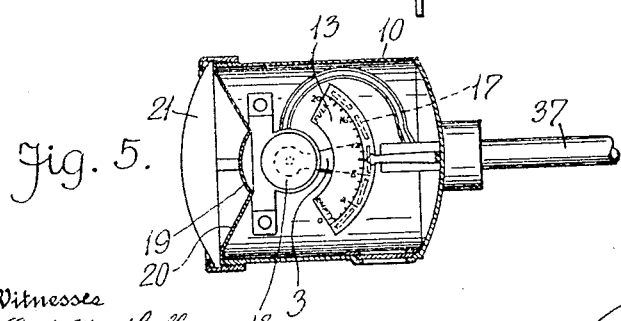
Inventor
William R. Pierce.
Witnesses
By
Attorneys

W. R. PIERCE.
DASH VISION TANK GAGE.
APPLICATION FILED OCT. 30, 1916.

1,236,347.

Patented Aug. 7, 1917.
3 SHEETS—SHEET 3.

Witness
Charles Balg

Inventor
William R. Pierce
By
Attorneys

UNITED STATES PATENT OFFICE.

WILLIAM R. PIERCE, OF DETROIT, MICHIGAN, ASSIGNOR TO DASH VISION GAUGE CORPORATION, OF NEW YORK, N. Y., A CORPORATION OF NEW YORK.

DASH-VISION TANK-GAGE.

1,236,347.   Specification of Letters Patent.   Patented Aug. 7, 1917.

Application filed October 30, 1916. Serial No. 128,444.

*To all whom it may concern:*

Be it known that I, WILLIAM R. PIERCE, a citizen of the United States of America, residing at Detroit, in the county of Wayne and State of Michigan, have invented certain new and useful Improvements in Dash-Vision Tank-Gages, of which the following is a specification, reference being had therein to the accompanying drawings.

In the use of tank gages for automobiles it is desirable that the contents of the tank be indicated both when the latter is being filled and at the forward part of the car at the dash or footboard so that the driver can at all times have full knowledge of the condition of his fuel supply.

The translation of motion of a float or other mechanism in the tank to the forward part of the car involves many difficulties because of the light and fragile mechanism involved and the difficulties of obtaining a sensitive response to a float movement at a distance therefrom.

This invention relates to a dash vision tank gage that is readily readable both from the driver's station and at the tank itself and that does not use intricate or easily disturbed mechanism, or require any power to produce the required reading either at the tank or at the front of the car.

Another feature is the combination of the gage with the usual tail light and license plate light.

The invention consists in the matters hereinafter set forth, and more particularly pointed out in the appended claims.

In the drawings,

Fig. 3 is a view in vertical section taken through the device, showing its method of attachment to a tank, the latter being partially broken away;

Fig. 4 is a plan view of the device with the float connection;

Fig. 5 is a view in horizontal section taken on or about line V—V of Fig. 3;

Fig. 6 is a view in detail showing a reflector at a right angle;

Figs. 7 and 8 are views in detail of a foot board or cowl indicator,

Figure 1:
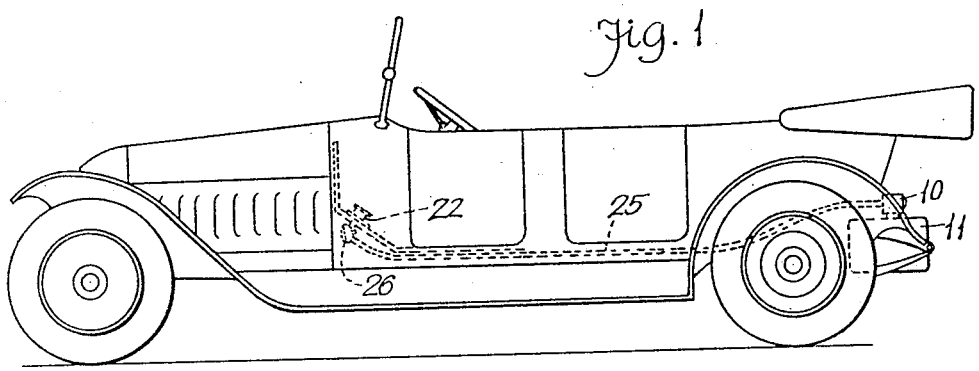
Figure 1 is a view, largely diagrammatic, of an automobile equipped with a gage that embodies features of the invention.
Figure 2:
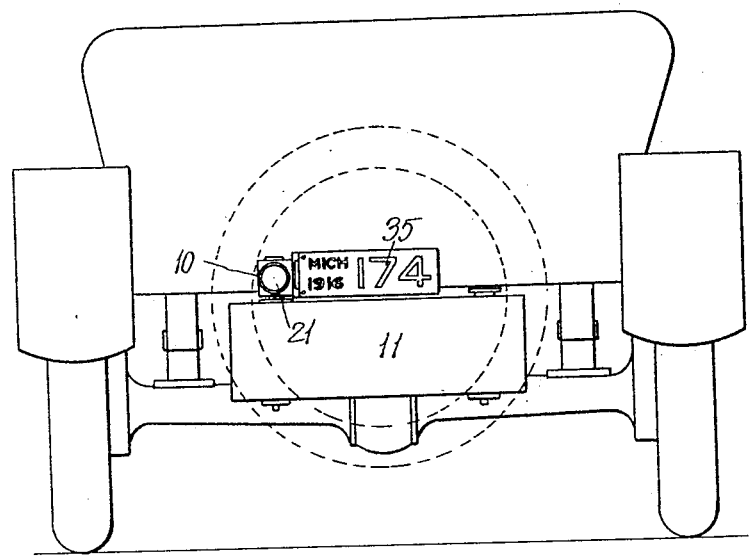
Fig. 2 is a view in rear elevation, enlarged, of the device, mounted on a vehicle.

In the drawings, a float-controlled mechanism 1 is mounted in the vehicle tank 2 so as to produce movement or oscillation in a swinging arm 3. This mechanism may take any preferred form and is herein illustrated as a rock arm 4 with a float 5 at the outer end thereof pivoted in the lower portion of a standard 6, so as to oscillate a beveled gear 7. The latter meshes with and therefore drives a pinion 8 which in turn rotates a spindle 9 mounted in suitable bearings in the standard 6. The arm 3 is carried by the upper end of the spindle 9 and it is to be understood that the connections at the opening made in the tank wall, and the joints caused by the bearings or journals of the spindle 9 in the casing 1 are such as to prevent leakage. A casing 10 is mounted on the tank to house the arm 3, there preferably being an interval between the tank top 11 and casing to permit ventilation and prevent any collection of inflammable fuel vapor, if there be leakage through the spindle joint.

An upright lantern 12 is carried by the arm 3 with a segmental flange 13 on the top which underlies a fixed pointer 14. Suitable gradations on the flange, or other indicia, clearly visible through a view hole 16 in the casing top, permit direct reading of the gage by a person at the tank.

The lantern has a plurality of colored transparent plates 17 mounted therein so as to be brought in the path of rays from an electric bulb 18 and a reflector 19 as they are swung around the lamp by the oscillations of the arm 3. The reflector 19 is of such shape and is secured by supports 20 in such manner so as not to interfere with admission of light from the bulb 17 to a bull's-eye 21 appropriately colored as a tail lamp and disposed on the rear or back of the casing 10.

At the forward end of the vehicle to which the device is applied and within clear view of the chauffeur, is a chromatic indicator which consists of a casing 22 having an annular rim plate 23 divided into segments of different colors corresponding each to the color of one of the several transparent plates 17 in the lantern. These are disposed around the tubular bore of the casing 22, the whole being covered by a suitable transparent plate 36 secured in any preferred manner as by a holding member 24 over the mouth of the casing.

A conduit 25, the inner end portion of which is inserted in the bore of the casing 22 leads to the casing 10, the other end 37 thereof being secured in substantially parallel and axial alinement with the axis of the reflector 19. The conductor is preferably of brass or like material susceptible of high polish, and the interior thereof is capable of reflecting rays that are projected therein by the reflector 19. Because of this, the tube is not necessarily straight but may have such bends and angles as may occur in the proper mounting of the conduit along the vehicle chassis.

While not necessary, acute angles in the conduit may be provided with reflecting mirrors, and such an arrangement is shown in Fig. 6, wherein an elbow 26 that receives two sections 27 and 28 of the conduit, has a reflecting plate or mirror 29 secured by a suitable cover 30 across an opening that is so disposed in the elbow that the light entering one conduit branch is thrown directly into the other.

As a further detail of construction, there may be a side opening to the casing 10, such that the light bulb 17 illuminates a license plate 35 disposed suitably in proximity thereto.

In operation, when the tank is full, a distinctively colored lantern plate is brought between the reflector and the conduit so that light of the same color as that of the "full" section of the chromatic indicator is thrown through the tube and illuminates the translucent pane 23 which covers the casing top as clearly shown in Figs. 7 and 8. A change in level produces a corresponding change in the color of the indicator opening, and comparison with the colored segments gives direct reading to the observer.

Thus the tank gage is readable not only at the tank but at the dash or footboard of the vehicle. The transmission of the indicating means between the two points is accomplished without the aid of any mechanism or the like which would ordinarily be readily disarranged and possibly put out of operation by slight disturbances in the car itself. Furthermore the device is a perfectly clear and distinct tail light and is a source of illumination for the license plate. The distance between the chromatic indicator and the gage mechanism, is immaterial and the conductor may be bent and deflected around as many angles and bends as is necessary to properly mount the same on the machine.

Figure 9:
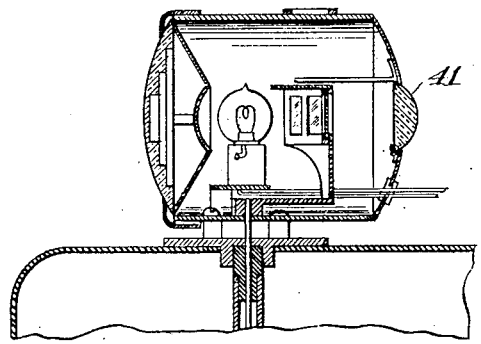
Fig. 9 is a view in detail of a modification of the device.
Figure 10:
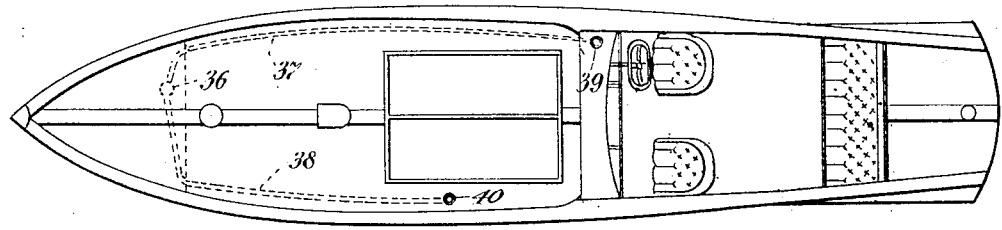
Fig. 10 is a view showing a multiple of the indicating means.

More than one conductor may be employed with proper duplication of the light coloring means, and the form may be designed for any requirement of service. As indicated in Fig. 10, an indicator 36 may have two or more conduits 37 and 38 each projecting or reflecting the light rays through the top of casings 39 and 40 to produce the desired color indication. There may be an indicator opening arranged directly at or adjacent the main casing, so that when the device is used on a launch or vessel, the color indicia may be seen from a distance. As indicated in Fig. 9 there may be a lens 41 or transparent plate or opening in the main casing through which the lantern projects selectively as in the form having the conduits.

Obviously, changes in the details of construction may be made without departing from the spirit of my invention and I do not care to limit myself to any particular form or arrangement of parts.

What I claim is:—

1. A tank gage comprising mechanism operated by change of level in the fluid contents of a container, a source of light, means for conducting light therefrom to a point distant from the mechanism, and means controlled by the mechanism for projecting rays of distinctive color each corresponding to a predetermined level through the conductor.

2. A gage for indicating the level of the fluid contents of a container, comprising means for projecting rays of light to illuminate a chromatic indicator and for changing the color of the projected rays to indicate predetermined levels in the liquid of the container.

3. A gage for indicating the level of the fluid contents of a receptacle comprising means adapted to be operated by changes of level in the fluid, for projecting rays along an indirect path to a chromatic indicator and for imparting color to the projected rays to indicate predetermined levels in the fluid.

4. The combination of an automobile and tank thereon, with a gage on the tank including means to automatically project light rays the color of which changes in accordance with the level reached by the tank contents, along an indirect path to a chromatic indicator remote from the tank.

5. A gage for tanks comprising a chromatic indicator, a tubular light conductor extending therefrom, means for projecting light therethrough, a gage for indicating the level of the tank contents, and means operated by the gage mechanism for imparting color distinctive of the level of the tank contents to the projected light rays.

6. A gage for tanks comprising a chromatic indicator, a source of light, means for conducting light from the source along an indirect path to the indicator, and float controlled mechanism for interposing transparent light media of different colors in the path of the projected light.

7. A gage for tanks comprising a chromatic indicator, a source of light, means for projecting light from the source along an indirect path to the indicator, and float controlled mechanism for coloring the projected rays in accordance with the position assumed by the operating float.

8. A gage for tanks comprising a tubular light conductor having an interior reflecting periphery and terminating in a transparent or translucent plate surrounded by an annulus divided into segments of different color, means for projecting light rays into the tubular conductor, and means operated by tank gage mechanism for coloring the projected rays whereby the indicator plate assumes a segment color corresponding to a definite position assumed by the gage mechanism.

9. A tank gage comprising float controlled mechanism, a source of light, a tubular reflector terminating in a chromatic indicator and carrying rays of light from the source, a lantern having transparent facets of color, each corresponding in color to a section of the indicator and means whereby the float mechanism interposes one of the facets between the source and the reflector in response to a predetermined position assumed by the gage mechanism.

10. A gage for tanks comprising a float controlled mechanism adapted to be secured on a receptacle and controlled by rise and fall of the contents thereof, an oscillating arm operated by the float, an index showing the position assumed by the arm in response to predetermined levels in the contents of the receptacle, means for projecting light along an indirect path to a chromatic indicator, and a lantern carried by the arm and provided with transparent facets of color each corresponding to index colors on the indicator, the arm being adapted to move the facets of the lantern into the path of the projected light whereby the facet through which the light passes corresponds in color to a predetermined segment of the indicator and a predetermined position of the float.

11. A tank gage comprising a casing containing a lantern and adapted to be mounted on a tank of an automobile as a tail light and provided with a view opening therethrough and means for indicating the contents level of the tank on which the casing is mounted, housed within the casing in range of the view opening and illuminated by the light thereof.

12. A tank gage comprising a casing containing a lantern and adapted to be mounted on a tank of an automobile as a tail light and provided with a view opening therethrough, means for indicating the contents level of the tank on which the casing is mounted, housed within the casing in range of the view opening and illuminated by the light thereof, a license plate holder connected to the casing and means for directing the light within the casing across the holder.

13. The combination of an automobile and the tank thereof with a casing containing a lantern adapted to be mounted on the tank as a tail light and provided with tank level indicating means, the indicating parts of which are housed in the casing within range of a view opening therethrough and are illuminated by the lantern light.

14. The combination of a tank with a casing having a source of light within and adapted to be mounted thereon as a tail light and provided with a view opening and float operated gage mechanism for indicating the tank level, forming with the casing a unitary structure, the indicating portion of the gage mechanism being housed in the casing within range of the view opening and being illuminated by the casing light.

15. The combination with an automobile and a supply tank therefor of a casing housing a source of light and adapted to be mounted on the tank as a tail light and mechanism for gaging the contents of the tank, forming a unitary structure with the casing and having indicating means illuminated by the casing.

In testimony whereof I affix my signature in the presence of two witnesses.

WILLIAM R. PIERCE.

Witnesses:
ANNA M. DORR,
CHAS. W. STAUFFIGER.

Copies of this patent may be obtained for five cents each, by addressing the "Commissioner of Patents, Washington, D. C."